United States Patent
Cao (10) Patent No.: US 8,705,962 B2
(45) Date of Patent: Apr. 22, 2014

(54) DATA TRANSMISSION METHOD, DATA PROCESSING NODE, AND DATA TRANSMISSION SYSTEM

(75) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 700 days.

(21) Appl. No.: 12/896,070

(22) Filed: Oct. 1, 2010

(65) Prior Publication Data

US 2011/0020004 A1    Jan. 27, 2011

Related U.S. Application Data

(63) Continuation of application No. PCT/CN2009/071154, filed on Apr. 3, 2009.

(30) Foreign Application Priority Data

Apr. 9, 2008    (CN) .......................... 2008 1 0089934

(51) Int. Cl.
H04Q 11/00    (2006.01)

(52) U.S. Cl.
USPC .............................. 398/54; 398/51

(58) Field of Classification Search
USPC ..................................... 398/51, 54
See application file for complete search history.

(56) References Cited

U.S. PATENT DOCUMENTS

| | | | |
|---|---|---|---|
| 6,738,582 B1 | 5/2004 | Moshe et al. | |
| 7,260,327 B1 | 8/2007 | Shin et al. | |
| 7,280,478 B2 | 10/2007 | Oh et al. | |
| 2002/0109878 A1 | 8/2002 | Qiao | |
| 2003/0206521 A1 | 11/2003 | Qiao | |
| 2004/0213572 A1 | 10/2004 | Doh et al. | |
| 2005/0147411 A1 | 7/2005 | Hamou et al. | |
| 2006/0147209 A1* | 7/2006 | Tian et al. | ........................ 398/59 |
| 2006/0274654 A1 | 12/2006 | Shankara | |
| 2007/0047958 A1* | 3/2007 | Gumaste | .......................... 398/69 |

FOREIGN PATENT DOCUMENTS

| | | |
|---|---|---|
| CN | 1489322 A | 4/2004 |
| CN | 1512698 A | 7/2004 |
| CN | 1845516 | 10/2006 |
| CN | 101557339 | 4/2012 |

OTHER PUBLICATIONS

Written Opinion of the International Searching Authority, mailed Jun. 4, 2009, in corresponding International Application No. PCT/CN2009/071154 (4 pp.).

First Chinese Office Action, mailed Jan. 26, 2011, in corresponding Chinese Application No. 200810089934.1 (11 pp.).

(Continued)

*Primary Examiner* — Nathan Curs
(74) *Attorney, Agent, or Firm* — Staas & Halsey LLP (57) ABSTRACT

A data transmission method, a data transmission system and a data processing node are provided to improve the resource utilization. The data transmission method includes the following steps: a second data processing node receives control information sent from a first data processing node through a preset control channel, where the control information includes at least bandwidth information of a data channel for sending optical burst data and corresponds to the service information of optical burst data of the first data processing node; the second data processing node controls the transmission of pending optical burst data according to the bandwidth information. A data processing node and a data transmission system are also provided.

4 Claims, 8 Drawing Sheets

(56) References Cited

OTHER PUBLICATIONS

Jaedon Kim et al., "Optical Burst Transport: A Technology for the WDM Metro Ring Networks", Journal of Lightwave technology, vol. 25, No. 1, Jan. 2007.

Andrea Fumagalli et al., "A Low-Latency and Bandwidth-Efficient Distributed Optical Burst Switching Architecture for Metro Ring", 2003 IEEE.

Fu-Tai An et al., "Success: A Next-Generation Hybrid WDM/TDM Optical Access Network Architecture", Journal of Lightwave technology, vol. 22 No. 11 Nov. 2004.

Jian-jun Tang et al., "Study of Control Protocol in Optical Burst Switching Ring Network with Dynamic Wavelength Add-Drop Multiplexer", Chinese Journal of Lasers, vol. 32, No. 7, Jul. 2005.

International Search Report for PCT/CN2009/071154, mailed Jun. 4, 2009.

European Search Report dated Aug. 23, 2011 issued in corresponding European Patent Application 09729912.7.

Yutaka Arakawa et al. "Optical Burst Switched Ring Network with Upstream Prioritized Switching and Distributed Fairness Control", Electronics and Communications in Japan Part 1, vol. 90 No. 8, 2007, pp. 30-39.

Hui-Tang Lin et al. "CORNet: An OBS metro ring network with QoS support and fairness control", Computer Networks, Elsevier Science Publishers, vol. 52 No. 10, 2008, pp. 2045-2064.

* cited by examiner

DATA TRANSMISSION METHOD, DATA PROCESSING NODE, AND DATA TRANSMISSION SYSTEM

CROSS-REFERENCE TO RELATED APPLICATIONS

This application is a continuation of International Application No. PCT/CN2009/071154, filed on Apr. 3, 2009, which claims priority to Chinese Patent Application No. 200810089934.1, filed on Apr. 9, 2008, both of which are hereby incorporated by reference in their entireties.

FIELD OF THE INVENTION

The present invention relates to the communication field, and in particular to, a data transmission method, a data processing node, and a data transmission system.

BACKGROUND OF THE INVENTION

With the increase of bandwidths, methods for implementing service convergence at the electrical layer (the typical method is via a multi-service transport platform (MSTP)) become more and more expensive due to the use of a lot of transponders. Thus, the metropolitan wavelength division multiplexing (WDM) technology is extensively used. However, the wavelength bandwidth is rather large for the mainstream applications at present and in the coming years. Thus, when the wavelength is used to carry new dynamic services such as the Internet Protocol Television (IPTV) service, the bandwidth utilization is low.

In the prior art, a sub-wavelength optical switching technology similar to the optical burst switching/optical packet switching (OBS/OPS) is able to provide service convergence and switching at the optical layer. It is applicable to the transmission of dynamic services of sub-wavelength granularities, and may help to reduce the quantity of transponders and lower the cost.

Optical burst ring (OBRing) means that the OBS is introduced in a ring. Because the ring network has a simple topology and a single service flow direction, the middle data processing node of the OBRing does not need to perform complex switching. In this way, the OBRing may avoid contentions and conflicts. In addition, because the OBRing reserves the ability of the OBS to provide small-granularity service convergence at the optical layer, the OBRing can carry dynamic services including IPTV in a cost-effective manner, with a better application prospect.

In the prior art, the OBRing solution is an Ethernet-based OBS solution. In this solution, a fixed-wavelength receiver and a wavelength tunable transmitter are used, and a fiber delay line (FDL) array is set on each data processing node to synchronize the control channel with the data channel.

However, in this solution, each data processing node forms a receiving tree, and different receiving trees (that is, different data processing nodes) do not share the bandwidth. Thus, the resource utilization is reduced.

SUMMARY OF THE INVENTION

Embodiments of the present invention provide a data transmission method, a data processing node, and a data transmission system to improve the resource utilization.

A data transmission method includes: by a second data processing node, receiving control information sent from a first data processing node through a preset control channel, where the control information includes at least bandwidth information of a data channel for sending optical burst data and corresponds to the service information of optical burst data of the first data processing node; and controlling the transmission of pending optical burst data according to the bandwidth information.

A data processing node includes: a thin film filter, adapted to obtain control information from a control channel in a fiber on the network, where the control information includes at least bandwidth information of a data channel for sending optical burst data, or add control information to the control channel; and a control information processing unit, adapted to control the transmission of pending optical burst data according to the bandwidth information in the control information.

A data transmission system includes: a first data processing node, adapted to obtain service information of optical burst data, and send control information corresponding to the service information to a second data processing node through a preset control channel, where the control information includes at least bandwidth information of a data channel for sending the optical burst data; and the second data processing node, adapted to control the transmission of the pending optical burst data according to the bandwidth information.

According to the preceding technical solution, embodiments of the present invention have the following merits:

In embodiments of the present invention, a data processing node may obtain control information from other data processing nodes through a control channel; the control information includes the bandwidth information of a data channel for sending the optical burst data. In this way, the data processing node may know the current state of the data channel, and control the transmission of data in the data channel according to the bandwidth information. Thus, different data processing nodes may share the bandwidth resources of the data channel, improving the resource utilization.

DETAILED DESCRIPTION OF THE EMBODIMENTS

Embodiments of the present invention provide a data transmission method, a data processing node, and a data transmission system to improve the resource utilization.

In embodiments of the present invention, at data processing node obtains service information of pending optical burst data, and sends control information corresponding to the service information to a second data processing node through a preset control channel, where the control information includes at least bandwidth information of the data channel for sending the optical burst data and the bandwidth information is used by the second data processing node to control the transmission of optical burst data. Thus, different data processing nodes may share the bandwidth resources of the data channel, improving the resource utilization.

Figure 1A:
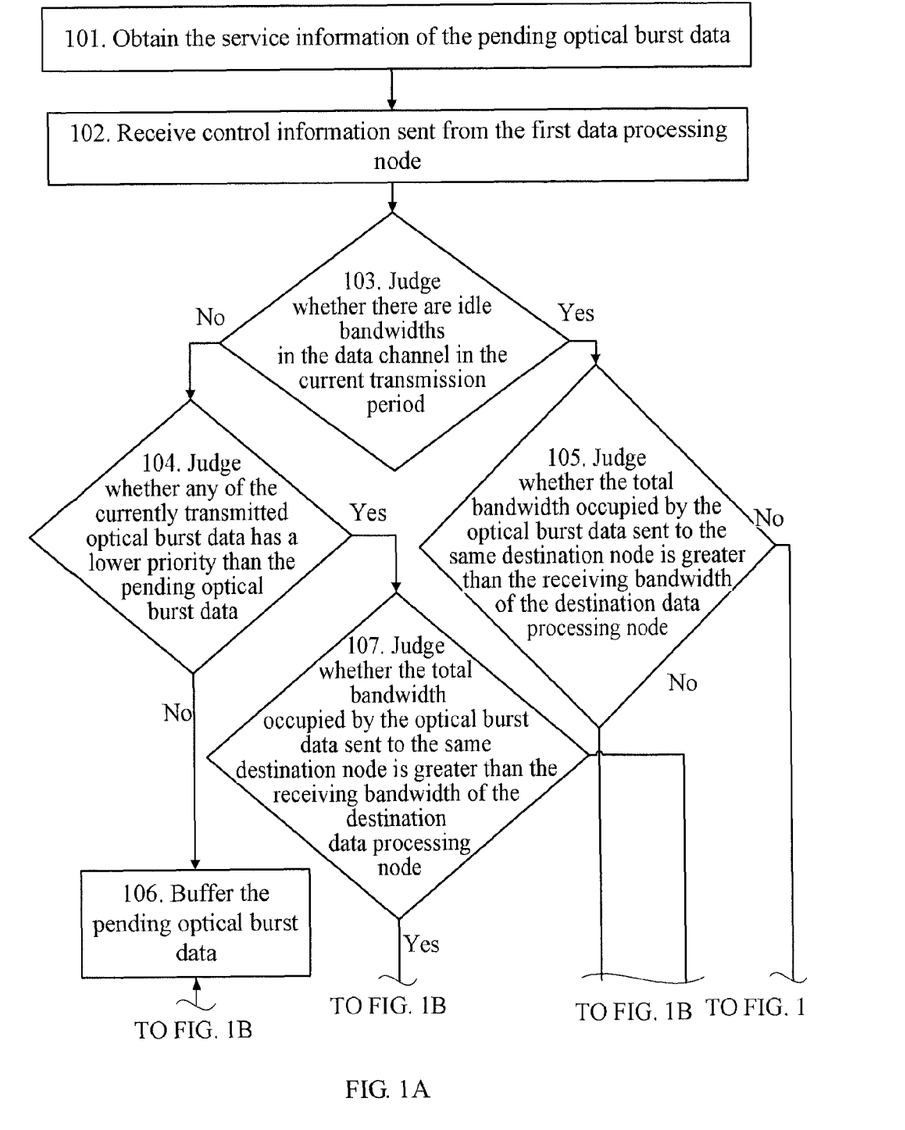
FIGS. 1A and 1B are a flowchart of a data transmission method in an embodiment of the present invention.
Figure 1B:
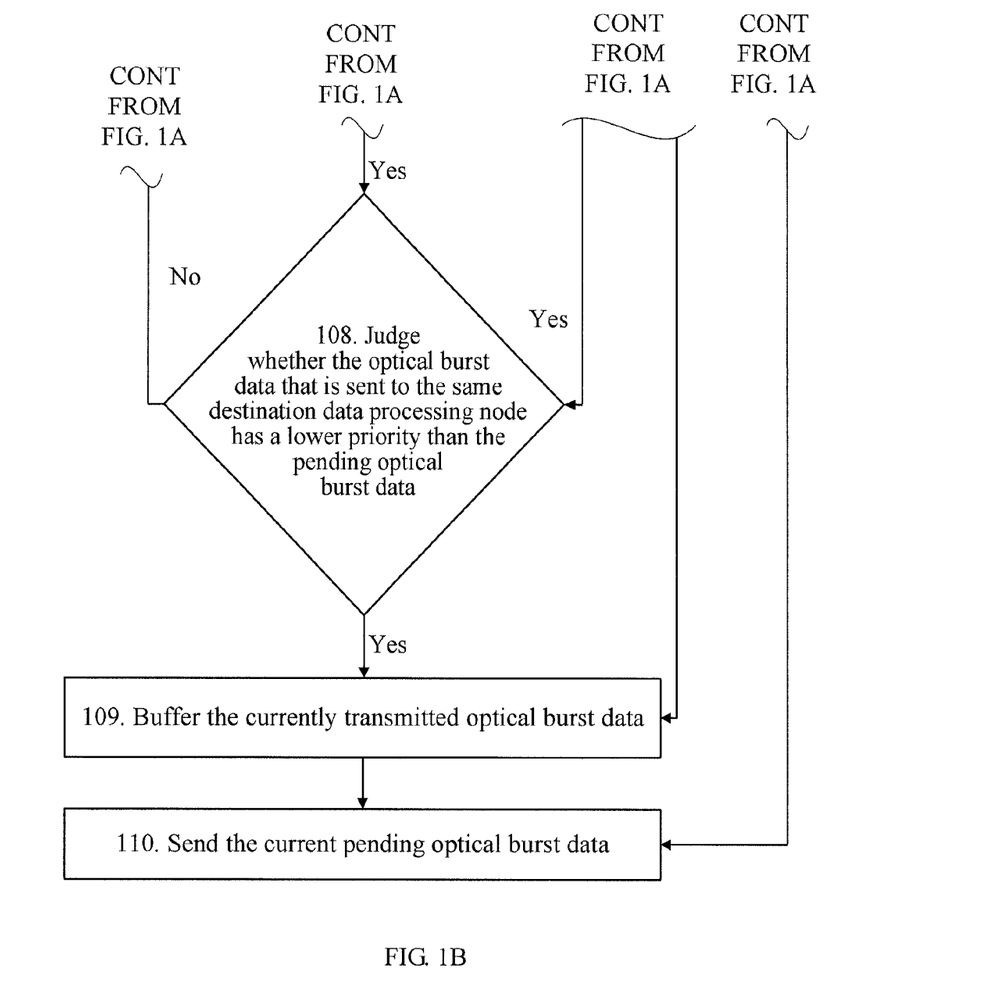

The following firstly describes the data transmission method in an embodiment of the present invention. As shown in FIGS. 1A and 1B, the data transmission method includes the following steps:

Step 101: The second data processing node obtains the service information of the pending optical burst data.

In this embodiment, to send optical burst data, the second data processing node needs to obtain related service information of the pending optical burst data firstly, where the service information may be the bandwidth information needed for sending the optical burst data.

Figure 2:
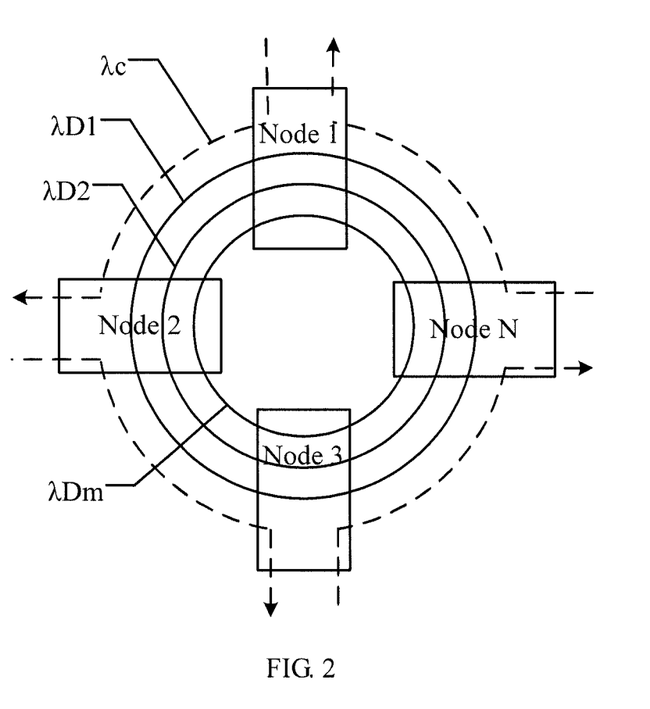
FIG. 2 is a schematic diagram illustrating a specific solution of a data transmission method in an embodiment of the present invention.

In this embodiment, during the initialization of the system, an independent wavelength needs to be planned as a control channel, that is, $\lambda_C$ shown in FIG. 2. In FIG. 2, $\lambda_{D1}$, $\lambda_{D2}$, and $\lambda_{Dm}$, are data channels. Each data processing node performs electrical processing on the control channel, that is, optical→electrical→optical conversion is required.

Step 102: The second data processing node receives control information from the first data processing node.

Similarly, the first data processing node also needs to obtain related service information of the optical burst data. After obtaining related service information of the optical burst data, the first data processing node generates control information corresponding to the service information, where the control information includes at least bandwidth information of the data channel for sending the optical burst data.

After generating control information, the first data processing node sends the control information to the second data processing node through the control channel.

In this embodiment, the control information in the control channel is periodic. The control information is processed according to the transmission period T. The following table shows the format of the control channel in a T period.

TABLE 1

| Frame header information | State information | Signaling (maintenance and management) information | Data payload |
| --- | --- | --- | --- |

The format of the control channel in Table 1 includes four parts, namely, frame header information, state information, signaling information, and data payload.

The frame header information is a fixed pattern, and adopts a six-byte value F628F628F628 in this embodiment. In actual applications, the specific contents of the frame header information may vary.

The state information indicates bandwidth occupancy details of each span, including wavelength flag, occupancy flag, destination address, source address, priority, multicast flag, last bit flag, and check bit.

The following table shows the format of the specific state information.

The signaling information is used to send maintenance and management information, such as route establishment, time sequence adjustment, and priority adjustment information.

The data payload is used to send some control information in some asymmetric service applications, for example, authentication and channel delivery in the IPTV.

The control information in this embodiment includes the preceding four parts. In actual applications, the contents in the control information may vary, but include at least bandwidth occupancy details of each span.

For better understanding, the following gives an example.

It is assumed that there are four data processing nodes on the ring network, namely, Node1, Node2, Node3, and Node4.

This embodiment and subsequent embodiments are based on the ring network. In actual applications, other types of networks may also be available, such as a mesh network, a chain network, and a star network.

In the first T period, the Node1 needs to send a piece of optical burst data to the Node2 and the Node4 respectively. The Node2 needs to send a piece of optical burst data to the Node3. In the second T period, the Node1 needs to send a piece of optical burst data to the Node3, and the Node2 needs to send a piece of optical burst data to the Node4.

At the beginning, the Node1 may classify the services and detect that services need to be sent. The Node1 obtains the service information, and begins to assemble the optical burst data. In addition, the Node1 updates the state information in the control channel to indicate the bandwidth occupancy details in the data channel corresponding to the control channel in this T period. For example, in the state information of the control channel in the first T period, the Node1 fills in the information that there is optical burst data sent from the Node1 to the Node2 in $\lambda_{D1}$ and that there is optical burst data sent from the Node1 to the Node4 in $\lambda_{D2}$. Then, the Node1 sends the control information through the control channel.

In actual applications, the Node1 needs to consider scenarios where other data processing nodes send control information to the Node1 when the Node1 assembles optical burst data for transmission and updates the control channel. This process is similar to that performed by the Node2. For better description, it is assumed that the sending of data by the Node1 is not limited in this embodiment.

Step 103: The second data processing node judges whether there are idle bandwidths in the data channel in the current transmission period. If so, the process goes to step 105; otherwise, the process goes to step 104.

After receiving the control information sent from the first data processing node through the control channel, the second data processing node reads the state information of the data channel (including bandwidth occupancy details) from the control channel and judges whether there are idle bandwidths in the data channel.

After receiving the control information from the control channel, the Node2 knows the details of subsequent optical burst data to be received, that is, it knows that there is optical burst data sent from the Node1 to the Node2 in $\lambda_{D1}$ in the next T period and that there is optical burst data sent from the Node1 to the Node4 in $\lambda_{D2}$. Because the data processing node has data that needs to be sent to the Node3 within this T period, the Node2 knows that the optical burst data in $\lambda_{D1}$ may

TABLE 2

| Wavelength flag (10 bits) | Occupancy flag (2 bits) | Destination address (10 bits) | Source address (10 bits) | Priority (4 bits) | Multicast flag (10 bits) | Last bit flag (2 bits) | Check bit (8 bits) |
| --- | --- | --- | --- | --- | --- | --- | --- | be received (that is, dropped) locally within this T period according to the received state information. Thus, there are idle bandwidths in $\lambda_{D1}$, and new optical burst data may be sent in $\lambda_{D1}$. That is, no transmission conflict exists. Supposing there is optical burst data sent from the Node1 to the Node3 in $\lambda_{D1}$, the Node2 knows that the optical burst data in $\lambda_{D1}$ in the T period is dropped only on the Node3. Thus, there is no idle bandwidth in $\lambda_{D1}$ in this T period.

If the network topology in this embodiment is a mesh topology (on which multiple inputs correspond to an output), the second data processing node judges whether a transmission conflict exists according to the data received from multiple data processing nodes; if so, the second data process node buffers the received optical burst data and/or the optical burst data to be sent by the second data processing node.

Step 104: The second data processing node judges whether the currently transmitted optical burst data is of a lower priority than the pending optical burst data; if so, the process goes to step 107; otherwise, the process goes to step 106.

In this embodiment, if the second data processing node determines that there are no idle bandwidths, the second data processing node judges whether the optical burst data sent in the data channel is of a lower priority than the optical burst data that the second data processing node needs to send according to the priority in the control information.

Step 105: The second data processing node judges whether the total bandwidth occupied by the optical burst data is greater than the receiving bandwidth of the destination data processing node; if so, the process goes to step 108; otherwise, the process goes to step 110.

The second data processing node obtains the total bandwidth occupied by the optical burst data by adding the bandwidth occupied by the optical burst data that is sent to the same destination data processing node in other data channels to the bandwidth occupied by the optical burst data sent by the second data processing node; the second data processing node judges whether the total bandwidth is greater than the receiving bandwidth of the destination data processing node; if so, it indicates that the destination data processing node cannot receive all the optical burst data at the same time, and the process goes to step 108; otherwise, it indicates that the destination data processing node may receive all the optical burst data at the same time, and the process goes to step 110.

Step 106: The second data processing node buffers the pending optical burst data and waits to repeat the preceding operations in the next period.

If the priority of any of the currently transmitted optical burst data is not lower than the priority of the pending optical burst data of the second data processing node or the priority of any of the optical burst data sent to the same destination data processing node is not lower than the priority of the pending optical burst data, the second data processing node buffers the pending optical burst data electrically, and waits to send such data in a subsequent T period. The specific buffering method is not limited. It should be noted that a buffering method other than electrical buffering may be used.

Step 107: The second data processing node judges whether the total bandwidth occupied by the optical burst data is greater than the receiving bandwidth of the destination data processing node; if so, the process goes to step 108; otherwise, the process goes to step 109.

After the second data processing node determines that the currently transmitted optical burst data is of a lower priority than the pending data in step 104, the second data processing node needs to further judge whether the total bandwidth occupied by the optical burst data that is sent to the same destination data processing node is greater than the receiving bandwidth of the destination data processing node.

The second data processing node obtains the total bandwidth occupied by the optical burst data by adding the bandwidth occupied by the optical burst data that is sent to the same destination data processing node in other data channels to the bandwidth occupied by the optical burst data sent by the second data processing nod.

The second data processing node judges whether the total bandwidth is greater than the receiving bandwidth of the destination data processing node; if so, it indicates that the destination data processing node cannot receive all the optical burst data at the same time, and the process goes to step 108. Otherwise, it indicates that the destination data processing node may receive all the optical burst data at the same time, and the process goes to step 109.

Step 108: The second data processing node judges whether the optical burst data that is sent to the same destination data processing node is of a lower priority than the pending optical burst data. If so, the process goes to step 109; otherwise the process goes to step 106.

The second data processing node judges whether any of the optical burst data that is sent to the same destination data processing node is of a lower priority than the pending optical burst data according to the control information sent from the first data processing node. If so, the process goes to step 109. Otherwise, it indicates that the destination data processing node cannot receive all the optical burst data at the same time, and the process goes to step 106.

Step 109: The second data processing node buffers the currently transmitted optical burst data, and the process goes to step 110.

If any of the optical burst data sent in the data channel is of a lower priority than the pending optical burst data of the second data processing node, and the destination data processing node of the pending optical burst data can receive all the optical burst data at the same time, including the pending optical burst data, the second data processing node buffers the optical burst data of a low priority locally, and sends the buffered data in a subsequent T period.

Step 110: The second data processing node sends the current pending optical burst data.

After the optical burst data of a low priority is buffered locally in step 109, idle bandwidths are available in the data channel. The second data processing node sends the pending optical burst data by using the idle bandwidths.

If there are idle transmission bandwidths in the data channel in step 105 and the destination data processing node can receive the optical burst data, the second data processing node may send the pending optical burst data.

Before sending the pending optical burst data, the second data processing node updates the control channel. For example, it updates the state information to reflect the latest state in the data channel.

If the second data processing node receives the optical burst data that needs to be forwarded, that is, the destination data processing node of the optical burst data is not the second data processing node, the optical burst data is forwarded through the same egress.

The preceding control information includes four parts. In actual applications, to reduce the data delay, the complete control information may be split for transmission. That is, the first control information including the bandwidth information of the data channel is sent firstly, and then the second control information including the management and maintenance information is sent. In this way, the data transmission delay is minimized. The first control information may further include priority information, a source data processing node identifier, and a destination data processing node identifier. However, the length of the first control information is smaller than that of the second control information.

In the preceding embodiment, to ensure the synchronization between the control channel and the data channel, a main data processing node needs to be set on the ring network to perform related operations. The operations include:

1. The main data processing node detects the time sequence relationship between the control channel and the data channel.

2. The main data processing data calculates the delay value of the control channel and/or the delay value of the optical burst data according to the detection result.

3. The main data processing node broadcasts the delay value of the control channel to other data processing nodes on the network, where the delay value is used to instruct other data processing nodes to wait for a time equal to the delay value before sending the control information through the control channel.

4. The main data processing node adjusts the optical delay unit array on the main data processing node according to the calculated delay value of the optical burst data so as to adjust the data channel delay of the main data processing node.

The main data processing node needs to detect the time sequence relationship between the control channel and the data channel. The main data processing node may be determined during the network construction. The process of detecting the time sequence relationship between the control channel and the data channel includes the following steps:

1. The main data processing node converts the obtained control information into an electrical signal to know the beginning time of the transmission period of the control channel.

2. The main data processing node detects the optical power in the data channel, and uses the time when the optical power reaches an extreme value within a transmission period as the beginning time of the transmission period of the data channel.

3. The main data processing node calculates a difference between the beginning time of the transmission period of the control channel and the beginning time of the transmission period of the data channel according to a preset control algorithm, and obtains the delay value of the control channel.

The specific calculation method and details are described in the subsequent embodiments. The main data processing node may obtain the control information and calculate the delay value; after calculating the delay value, the main data processing node may broadcast the delay value to other data processing nodes; after being updated, other data processing nodes wait for a time equal to the delay value before sending the control information.

Figure 3:
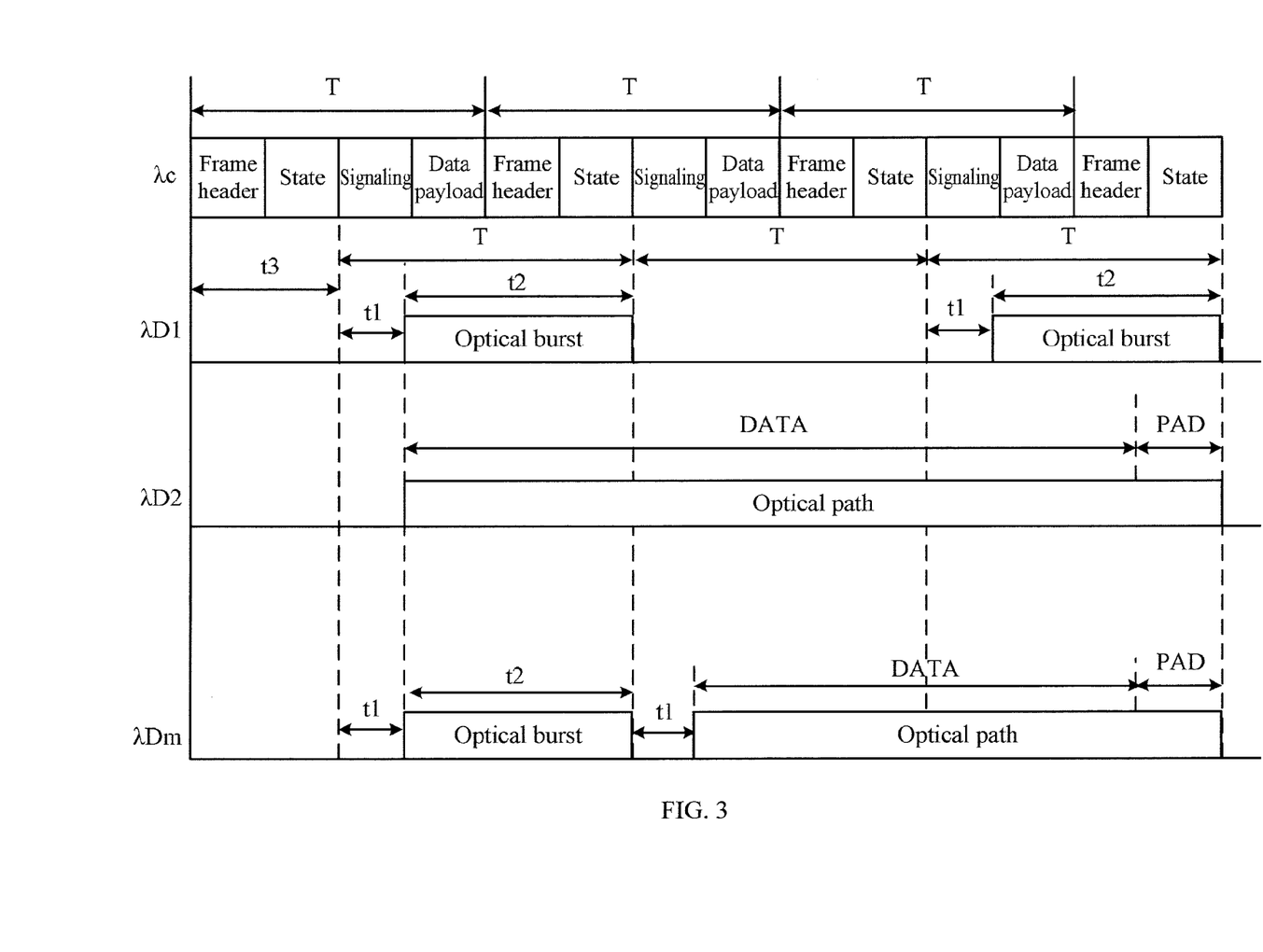
FIG. 3 illustrates a time sequence relationship between a data channel and a control channel in an embodiment of the present invention.

Specifically, each data processing node sends data according to the state information of the control channel. That is, each data processing node sends services in the T period. After sending the state information of the data in the control channel, each data processing node delays for t1. t1 represents the time for guaranteeing the switching of optical devices. FIG. 3 illustrates the time sequence relationship between the control channel and the data channel at the egress of each data processing node.

As shown in FIG. 3, t3 represents the delay time in sending data (including optical burst data and optical circuit) after the control information (the information in the control channel) is sent. The sum of t3 and t1 corresponds to the delay time when a client signal is assembled into the optical burst data at the data processing node. t1 is limited by the time for the switching of optical devices. Thus, the shorter t3 is, the shorter the data assembly delay is. As shown in Table 1, there is little state information. In the control channel, the signaling information and the data payload are separate from the state information. This reduces t3, thus reducing the assembly delay of the data, reducing the service transmission delay, and improving the transmission quality.

On the other hand, the hybrid transmission of the optical circuit and the optical burst data is supported in this embodiment. The optical circuit is sent by the T period. That is, the data processing node needs to send the information of resources occupied by the optical circuit every T period. Different from the optical burst data, the optical circuit does not need to be truncated every T period. If the optical circuit is already sent in a T period, filling bytes (PAD) may be added after the optical circuit.

In actual applications, the duration for sending the data may be longer or shorter than a T period. In this way, the data processing nodes need to perform the following operations to send the data:

The data processing node sends data within the current transmission period; if the data is sent completely before the current transmission period expires, the data processing node adds the PAD after the data until the current transmission period expires.

If the data is not sent completely when the current transmission period expires, the data processing node sends the data continuously in the next transmission period. Each data processing node only needs to update the control information in the T period, and indicate the information of data transmission. In this way, each data processing node may support transmission of data in variable length, including optical burst data in variable length and even circuit.

In the preceding embodiments of the present invention, a data processing node may obtain control information from other data processing nodes through a control channel, where the control information includes the bandwidth information of a data channel for sending the optical burst data. In this way, the data processing node may know the current state of the data channel, and control the transmission of data in the data channel according to the bandwidth information. Thus, different data processing nodes may share the bandwidth resources of the data channel, improving the resource utilization.

Secondly, the data processing node needs to detect transmission conflicts and receiving conflicts before sending the data; the data processing node sends the optical burst data only when no transmission conflicts and receiving conflicts exist. Thus, the stability of the data transmission can be improved.

Thirdly, the control information in the preceding embodiments may be split for transmission; the bandwidth resource occupancy details may be sent firstly, and then other related information is sent. Thus, the data transmission delay may be minimized, and the data transmission efficiency is improved. In addition, the bandwidth for the maintenance and management information is increased, thus facilitating the maintenance and management.

Finally, if the optical burst data is not sent completely when the current transmission period expires, the optical burst data is sent continuously in the next transmission period. Each data processing node only needs to update the control information in the T period, and indicate the information of data transmission. In this way, each data processing node may support transmission of data in variable length, including optical burst data in variable length and even circuit, thus extending the application scope of the solution in embodiments of the present invention.

Figure 4:
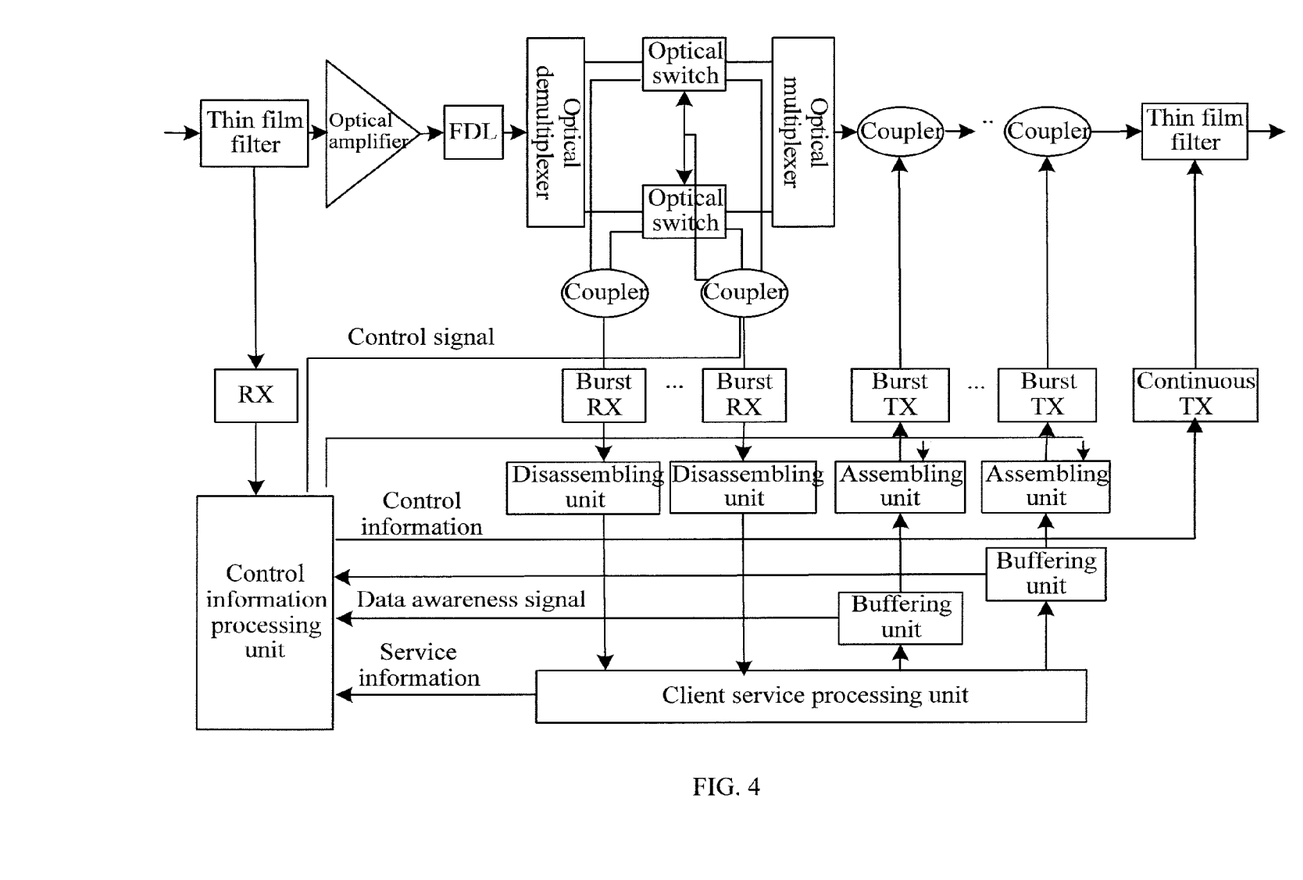
FIG. 4 is a schematic diagram illustrating a data processing node in an embodiment of the present invention.

As shown in FIG. 4, the data processing node provided in an embodiment of the present invention includes:

a thin film filter, adapted to obtain control information from a control channel in a fiber on the ring network or add the control information to the control channel in the fiber; and a control information processing unit, adapted to process the control information in the control channel, where: the control information includes but is not limited to the bandwidth information in the control information; the bandwidth information is carried in the state information of the control channel to control the transmission of the optical burst data; the control information includes at least the bandwidth information of the data channel for sending the optical burst data and is used to instruct the second data processing node to control the transmission of optical burst data according to the bandwidth information.

The data processing node further includes:

a client service processing unit, adapted to: access client signals, retrieve the service information, and classify services.

The data processing node further includes:

a buffering unit, adapted to: buffer data and output data awareness signals to the control information processing unit.

The data processing node further includes:

an optical demultiplexer, adapted to demultiplex different wavelengths from the fiber; and an optical multiplexer, adapted to multiplex wavelengths into the fiber.

The data processing node further includes:

a burst receiver (RX), adapted to: receive optical burst data and convert the optical burst data into an electrical signal;

a burst transmitter (TX), adapted to transmit optical burst data;

a coupler, adapted to couple multiple optical signals;

an assembling unit, adapted to assemble client signals into optical burst data; and a disassembling unit, adapted to disassemble the optical burst data into client signals.

Specifically, the thin film filter in FIG. 4 is adapted to drop the wavelength corresponding to the control channel $\lambda_C$ from the fiber on the ring network or add the wavelength to the fiber on the ring network.

The FDL is a fiber delay line (that is, the fiber delay unit) and is adapted to delay the optical signal.

The optical switch is a 1*(M+1) fast optical switch, where M represents the quantity of burst RXs (excluding the RX corresponding to the control channel).

The coupler is adapted to couple multiple optical signals.

The burst RX is a burst receiver and is adapted to: receive optical burst data, convert the optical burst data into electrical signals, and implement optical/electrical conversion. The RX is a continuous receiver and is adapted to receive a control channel.

The burst TX is a burst transmitter. The TX is a continuous transmitter with a fixed wavelength.

The assembling unit is adapted to assemble client signals such as Ethernet packets into optical burst data. If a client signal is a circuit, the assembling unit may not disassemble the circuit into optical burst data. The disassembling unit is adapted to disassemble the optical burst data into client signals.

The control information processing unit is adapted to process and update the information in the control channel.

The client service processing unit is adapted to: access client signals (optical/electrical conversion and electrical/optical conversion), retrieve service information (including service type, source address, destination address, and priority), and classify services.

The buffering unit is adapted to buffer data and output data awareness signals (information such as the availability and size of the data) to the control information processing unit.

The control signals are control signals between internal modules of some data processing nodes.

For better understanding, the following describes the connection relationship between the preceding units and handling procedures with reference to a specific embodiment.

It is assumed that there are four data processing nodes on the ring, namely, Node1, Node2, Node3, and Node4. In the first T period, the Node1 needs to send a piece of optical burst data to the Node2 and the Node4 respectively. The Node2 needs to send a piece of optical burst data to the Node3. In the second T period, the Node1 needs to send a piece of optical burst data to the Node3, and the Node2 needs to send a piece of optical burst data to the Node4. Supposing each span on the ring is long enough, and the duration for transmitting a signal in the line on the span is longer than the T period (this is not a necessary condition in this embodiment, where the situation of short span also applies).

In actual applications, the Node1 needs to consider scenarios where other data processing nodes send control information to the Node1 when the Node1 assembles optical burst data for transmission and updates the control channel. This process is similar to that performed by the Node2. For better description, it is assumed that the sending of data by the Node1 is not limited in this embodiment.

At the beginning, the client service processing unit on the Node1 sends service information to the control information processing unit, classifies the services and sends the services to the buffering unit. The buffering unit detects data, and sends a data awareness signal to the control information processing unit.

If the control information processing unit detects that services need to be sent and obtains the service information, the control information processing unit controls the assembling unit to assemble the optical burst data. In addition, the control information processing unit updates the state information in the control channel, and indicates the bandwidth occupancy details in the data channel corresponding to the control channel in this T period. For example, in the state information of the control channel in the first T period, the Node1 fills in the information that there is optical burst data sent from the Node1 to the Node2 in $\lambda_{D1}$ and that there is optical burst data sent from the Node1 to the Node4 in $\lambda_{D2}$.

The control information processing unit sends the control information to the TX; the TX implements optical/electrical conversion, and sends the control information in the control channel. After the state information in the control channel is sent completely, the burst TX is started. After t1, the burst TX sends the optical burst data to the Node2 and the Node4. In the second T period, the Node1 needs to indicate that there is optical burst data sent from the Node1 to the Node3 in $\lambda_{D1}$. Then, the preceding process is repeated.

After receiving the control information, the control information processing unit in the Node2 knows the details of subsequent optical burst data to be received, that is, it knows that there is optical burst data sent from the Node1 to the Node2 in $\lambda_{D1}$ in the next T period and that there is optical burst data sent from the Node1 to the Node4 in $\lambda_{D2}$. Thus, after processing the state information in the control channel, the control information processing unit controls an optical switch to switch to the burst RX. In addition, because the control information processing unit already knows that the data processing node has data that needs to be sent to the Node3 in this T period, the control information processing unit may check the received state information. Through the check, the control information processing unit knows that the optical burst data in $\lambda_{D1}$ is dropped locally in this T period. Thus, there are idle bandwidths in $\lambda_{D1}$, and new optical burst data may be sent in $\lambda_{D1}$. That is, no transmission conflict exists.

Further, the control information processing unit needs to check the quantity of optical burst data that is sent to the Node3 (the destination to which the data processing node sends the optical burst data) in this T period in all the data channels on the current ring network. The total quantity of the optical burst data sent to the Node3 and the optical burst data to be sent by the data processing node cannot exceed the receiving bandwidth of the Node3 (that is, the quantity of burst RXs receiving the optical burst data). That is, no receiving conflict exists. The receiving bandwidth information of other data processing nodes is broadcast through the signaling information in the control channel. That is, each data processing node knows the receiving bandwidths of other data processing nodes. After confirming that the bandwidth on the ring does not have any transmission conflict or receiving conflict, the control information processing unit controls the assembling unit to assemble and send the optical burst data. Otherwise, the data may be buffered in the buffering unit.

In this way, the conflict of the optical burst data may be effectively avoided at the optical layer. The handling procedures performed by the Node2 are similar in the second T period. The Node2 assembles a piece of optical burst data sent to the Node4, and sends the optical burst data to $\lambda_{D2}$.

The handling procedures performed by the Node3 and the Node4 are similar. In the first T period, the Node3 receives the optical burst data sent from the Node2, and the Node4 receives the optical burst data sent from the Node1. In the second T period, the Node3 receives the optical burst data sent from the Node1, and the Node4 receives the optical burst data sent from the Node2.

Figure 5:
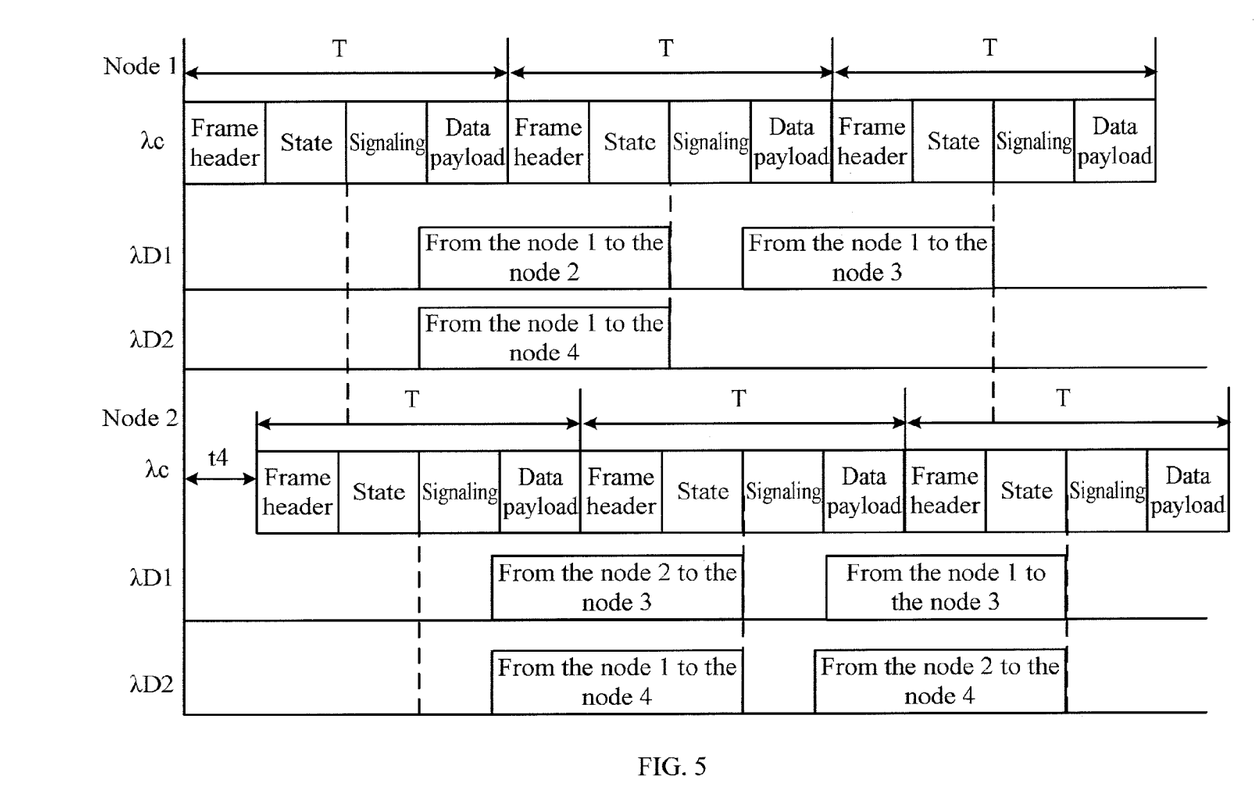
FIG. 5 illustrates a service transmission time sequence in an embodiment of the present invention.

FIG. 5 illustrates the time sequence between the Node1 and the Node2 at the egress. In FIG. 5, t4 represents the sum of the line transmission delay between the Node1 and the Node2 and the processing delay of the control channel of the Node2.

Because each data processing node may drop the optical burst data of any wavelength, the transmitter corresponding to the optical burst data of the data processing node may use a fixed wavelength. If the uplink bandwidth of the data processing node exceeds a wavelength, a fixed wavelength may be planned for the data processing node. If the uplink bandwidth of the data processing node does not exceed a wavelength, the uplink bandwidth is shared by each data processing node on the ring.

In the preceding embodiment, an important thing is to maintain the time sequence relationship between the control channel and the data channel output by each data processing node, as shown in FIG. 3. The control information in the control channel needs to undergo optical→electrical→optical conversion and processing and update on each data processing node. Supposing the time is ti (each data processing node may vary in a specific range), the data channel is pass-through at the optical layer on the middle data processing node (rather than the destination data processing node). That is, on each data processing node, the delay of the control channel is longer than that of the data channel. If the control information does not undergo any processing, the delay between the control channel and the data channel may be gradually reduced when the control information passes through a data processing node. That is, t1 in FIG. 3 turns smaller. As a result, the optical switch has no enough time to perform switching on the destination data processing node, and the data dropped by the data processing node may be damaged.

Thus, in this embodiment, an FDL needs to be set on each data processing node. In addition, an FDL control unit is added on the basis of the preceding data processing node to form a main data processing node. The main data processing node calculates and broadcasts the delay value so as to maintain the time sequence relationship between the control channel and the data channel.

Figure 6:
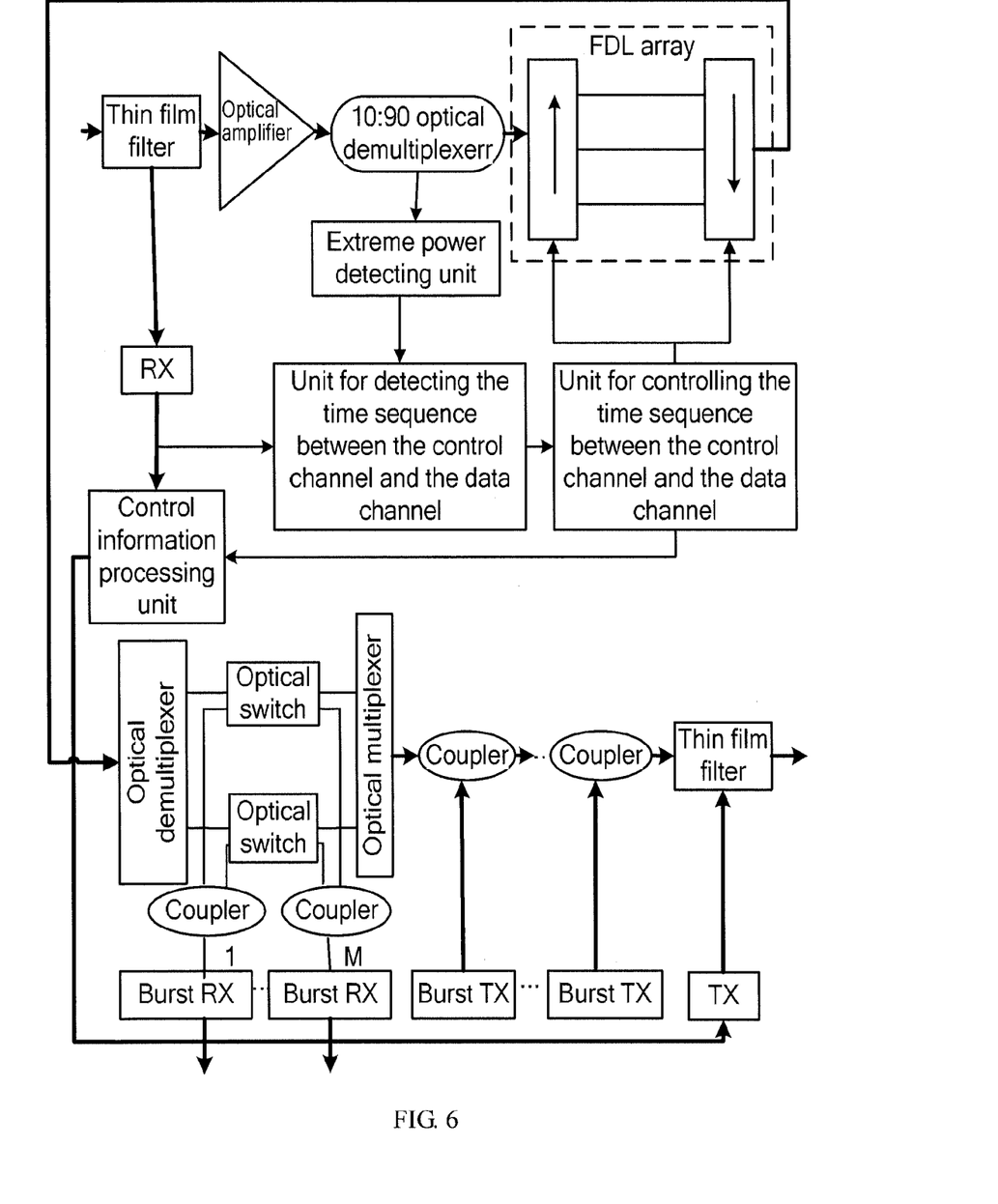
FIG. 6 is a schematic diagram illustrating the control of a time sequence between a control channel and a data channel by a main data processing node in an embodiment of the present invention.

The following describes a process of controlling the time sequence by the main data processing node. As shown in FIG. 6, the extreme power detecting unit detects the time when the data in the data channel reaches the extreme power in this T period, that is, the beginning time of the data in the data channel, and sends the beginning time to the data channel time sequence detecting unit.

The unit for detecting the time sequence between the control channel and the data channel detects the beginning time of the control channel by using the RX corresponding to the control channel. It compares the beginning time of the data channel with the beginning time of the control channel to obtain a difference between the control channel and the data channel, and send this difference to the unit for controlling the time sequence between the control channel and the data channel.

The unit for controlling the time sequence between the control channel and the data channel calculates ΔT based on the difference, and sends ΔT to the control information processing unit. The control information processing unit broadcasts ΔT through the signaling information in the control channel, so that each data processing node may delay for ΔT after sending the updated control channel. After the preceding process is repeated, a closed-loop control system is formed so as to maintain the time sequence between the control channel and the data channel on each data processing node on the ring.

If the delay on the whole ring is not an integral multiple of T, a very large ΔT value or an unstable ΔT value may be obtained through the preceding method. This means that the data transmission delay on the ring is very large or the time sequence between the control channel and the data channel may fluctuate. To solve this problem, an FDL array is set on the main data processing node. The FDL array consists of two optical switches and some delay lines of which the delays are increased by two times. As shown in FIG. 6, when the time sequence relationship between the control channel and the data channel cannot be maintained by adjusting the delay of the control channel, the FDL array and the delay of the control channel are adjusted to maintain the time sequence relationship between the control channel and the data channel. The unit for controlling the time sequence between the control channel and the data channel may adjust the FDL array to ensure that the delay on the ring is an integral multiple of T. By using the preceding ΔT control mechanism, a relatively stable ΔT value is obtained. In this way, the time sequence between the control channel and the data channel on each data processing node on the ring is maintained.

In the prior art, to send services to other data processing nodes, each data processing node must have the ability to adjust different wavelengths. That is, the transmitting laser on each data processing node must be a fast wavelength tunable burst laser. This kind of laser is very expensive, resulting in a high cost in the implementation of the solution in the prior art. In embodiments of the present invention, a fixed burst laser is used to implement data transmission, thus reducing the cost.

It is understandable that a wavelength tunable burst transmitter on each data processing node may also be used. Compared with the prior art, embodiments of the present invention may reuse the link bandwidth on the ring, improve the bandwidth utilization, and support a larger network transmission capacity.

In addition, in the prior art, an FDL array is used on each data processing node to adjust the time sequence between the control channel and the data channel. The FDL array, however, is very expensive and can only select a discrete value, so that the stability of the time sequence between the control channel and the data channel cannot be guaranteed. If there are a lot of data processing nodes on the ring, this problem is more obvious, thus affecting the data transmission quality. In embodiments of the present invention, electrical delays are controlled in a closed loop, and thus the control precision is improved.

Figure 7:
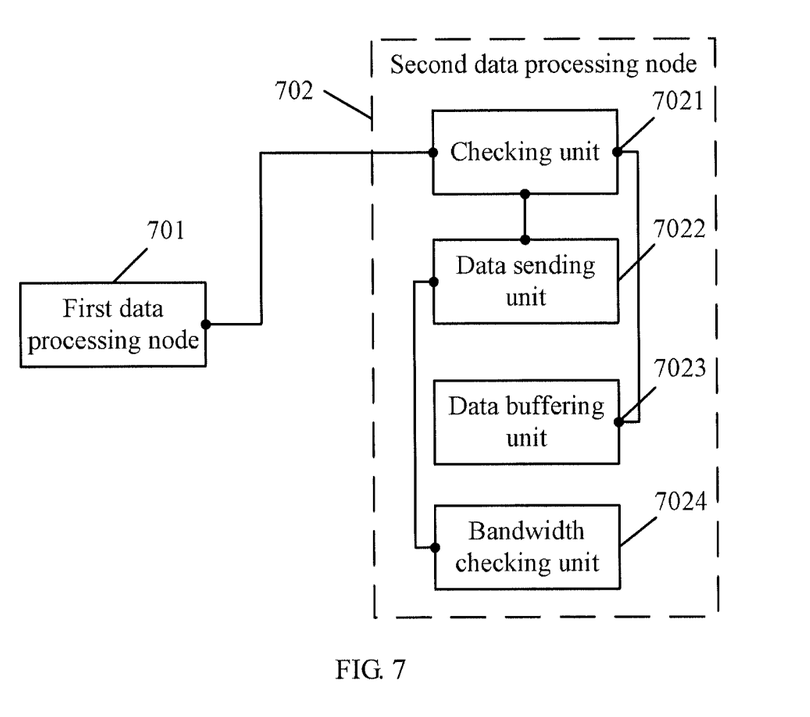
FIG. 7 is a schematic diagram illustrating a data transmission system in an embodiment of the present invention.

The following describes the data transmission system in an embodiment of the present invention. As shown in FIG. 7, the data transmission system includes:

a first data processing node 701, adapted to: obtain service information of optical burst data, and send control information corresponding to the service information to a second data processing node through a preset control channel, where the control information includes at least bandwidth information of the data channel for sending the optical burst data; and a second data processing node 702, adapted to control the transmission of the optical burst data according to the bandwidth information.

The second data processing node 702 further includes:

a checking unit 7021, adapted to judge whether there are idle bandwidths in the data channel within the current transmission period according to the bandwidth information;

a data sending unit 7022, adapted to send the pending optical burst data to the destination data processing node of the pending burst data within the current transmission period when there are idle bandwidths; and a data buffering unit 7023, adapted to buffer the pending optical burst data when there are no idle bandwidths in electrical mode or other modes.

The second data processing node 702 may further include:

a bandwidth checking unit 7024, adapted to: judge whether the sum of the bandwidth occupied by the optical burst data that is sent to the destination data processing node of the pending optical burst data on the entire network in the current transmission period and the bandwidth occupied by the pending optical burst data exceeds the receiving bandwidth of the destination data processing node of the pending optical burst data; if not, instruct the data sending unit 7022 to send the pending optical burst data.

In this embodiment, the control information may further include the priority information of the optical burst data.

The second data processing node 702 is further adapted to: judge whether the optical burst data transmitted in a data channel is of a lower priority than the pending optical burst data; if so, buffer the currently transmitted optical burst data locally, and send the pending optical burst data through the data channel.

In embodiments of the present invention, a data processing node may obtain control information from other data processing nodes through a control channel, where the control information includes the bandwidth information of a data channel for sending the optical burst data. In this way, the data processing node may know the current state of the data channel, and control the transmission of data in the data channel according to the bandwidth information. Thus, different data processing nodes may share the bandwidth resources of the data channel, improving the resource utilization.

Persons having ordinary skill in the art understand that all or part of the steps of the method in the embodiments of the present invention may be implemented by a program instructing relevant hardware. The program may be stored in a computer readable storage medium. When the program is executed, the following steps are performed:

1. The second data processing node receives control information sent from the first data processing node through a preset control channel, where the control information includes at least bandwidth information of a data channel for sending optical burst data and corresponds to the service information of the optical burst data of the first data processing node.

2. The second data processing node controls the transmission of pending optical burst data according to the bandwidth information.

The above storage medium may be a read-only memory (ROM), a magnetic disk or a compact disk read-only memory (CD-ROM).

Detailed above are a data transmission method, a data transmission system and a data processing node. Persons having ordinary skill in the art can make variations and modifications to the present invention in terms of specific implementations and application scopes according to the ideas of the present invention. Therefore, the specifications shall not be construed as limitations to the present invention.

What is claimed is:

1. A data transmission method, comprising:
  receiving, by a second data processing node, control information sent from a first data processing node through a preset control channel, wherein the control information comprises at least bandwidth information of a data channel for sending optical burst data and corresponds to service information of the optical burst data of the first data processing node; and
  controlling transmission of pending optical burst data according to the bandwidth information;
  wherein the controlling of the transmission of the pending optical burst data by the second data processing node according to the bandwidth information comprises:
    judging, by the second data processing node, whether there are idle bandwidths in the data channel within a current transmission period according to the control information;
    sending the pending optical burst data within the current transmission period when the judging indicates there are idle bandwidths, and buffering the pending optical burst data when the judging indicates there are no idle bandwidths, and
  wherein the control information includes a destination data processing node identifier of the pending optical burst data; and
  the method comprises:
    sending, by the second data processing node, the pending optical burst data to a destination data processing node corresponding to the destination data processing node identifier.

2. A data transmission method, comprising:
  receiving, by a second data processing node, control information sent from a first data processing node through a preset control channel, wherein the control information comprises at least bandwidth information of a data channel for sending optical burst data and corresponds to service information of the optical burst data of the first data processing node; and controlling transmission of pending optical burst data according to the bandwidth information, wherein when the second data processing node is a main data processing node, the method comprises:
  synchronizing, by the second data processing node, the control channel with the data channel, wherein the synchronizing the control channel with the data channel by the second data processing node comprises:
  detecting, by the second data processing node, a time sequence relationship between the control channel and the data channel;
  calculating a delay value according to the detection result; and
  broadcasting the delay value to other data processing nodes through the control channel, wherein the delay value is used to instruct other data processing nodes to send the control information in the control channel after delaying the control information for a time equal to the delay value.

3. The method of claim 2, wherein the detecting the time sequence relationship between the control channel and the data channel comprises:
  converting, by the second data processing node, the obtained control information into an electrical signal to know a beginning time of the transmission period of the control channel; and
  detecting optical power in the data channel, using the time when the optical power reaches an extreme value within a transmission period as the beginning time of the transmission period of the data channel;
  calculating the delay value by the second data processing node according to the detection result comprises:
    calculating, by the second data processing node, a difference between the beginning time of the transmission period of the control channel and the beginning time of the transmission period of the data channel according to a preset control algorithm, and obtaining a delay value.

4. A data processing node, comprising:
a thin film filter, adapted to obtain control information from a control channel in a fiber on a network, wherein the control information comprises at least bandwidth information of a data channel for sending optical burst data, or add control information to the control channel; and
a control information processing unit, adapted to control transmission of pending optical burst data according to the bandwidth information in the control information,
wherein the control information further comprises a destination data processing node identifier; and
the control information processing unit is further adapted to: judge whether a sum of a bandwidth occupied by optical burst data that is sent to a destination data processing node of the pending optical burst data within a current transmission period and a bandwidth occupied by the pending optical burst data exceeds a receiving bandwidth of the destination data processing node of the pending optical burst data according to the bandwidth information in the control information; otherwise, send the pending optical burst data within the current transmission period;
and/or
the control information further comprises priority information of the optical burst data; and
the control information processing unit is adapted to: judge whether optical burst data sent in the data channel is of a lower priority than the pending burst data; if so, buffer the currently transmitted optical burst data locally, and send the pending optical burst data through the data channel.

* * * * *